United States Patent Office 3,474,014
Patented Oct. 21, 1969

---

3,474,014
ELECTROGRAVITATIONAL DESALINATION OF SALINE WATER
Albert H. Aul, San Bernardino, Calif., assignor to General Marine Technology Corporation, San Bernardino, Calif., a corporation of California
No Drawing. Filed July 13, 1965, Ser. No. 471,763
Int. Cl. C02b 1/82
U.S. Cl. 204—150                                   2 Claims

---

ABSTRACT OF THE DISCLOSURE

Electrogravitational method of desalination of salt water using two dissimilar metal electrodes connected externally which form a galvanic couple creating current flow through the system. Portions of salts that are attracted to the electrodes establish concentrated areas of higher density that settle to the bottom of container whereby the solution removed from the botom is of a greater concentration than the water thereabove.

---

This process removes the saline materials from saline water for the purpose of making the water potable and useful for agriculture without ill effect.

The novelty of this invention is that it requires no application of energy from any source external to the process; that it incorporates no critical or strategic materials and that it is completely self-contained.

Existing desalination processes require the application of heat energy or electrical energy from an independent source to make the process operational, whether for direct separation of saline material from water by electrolytic means using applied electricity, distillation of steam or evaporated water, operation of pumps and other equipment necessary to such processes.

This invention produces its own electrical energy as well as making it possible to recover more than eighty percent (80%) of the volume of saline water injected into the process, as desalinated water.

Minerals such as aluminum and alloys of aluminum and other minerals react with saline materials that are dissolved and suspended in saline water. These chemical reactions cause the saline materials to combine with the minerals placed in the water for that purpose. The chemical reactions cause a change in the energy levels of various atoms in the reacting molecules.

When non-reacting minerals such as copper, alloys of copper or other minerals are placed at a distance from the reacting minerals with an unobstructed quantity of saline water between the reacting and non-reacting materials, an electro-static field is caused to exist.

The mineral in contact with the saline water and reacting with the saline water is termed the cathode. The mineral in contact with the saline water and considered non-reacting with the saline water is termed the anode. When the cathode and anode are placed at a distance from each other with an unobstructed quantity of saline water in contact with the surface of each, and when an electrically conductive material is placed so that it continually is in contact with both cathode and anode, but not in contact with the saline water, an electric current is caused to exist. The rate of chemical reaction, production of electrical energy and rate of separation of the saline materials and their removal from the saline water are proportional.

Saline water tested by this process was obtained from the Pacific Ocean having a content of dissolved and suspended solids 44,000 milligrams per litre of water of which 6400 milligrams of the same solids were $CaCO_3$ (calcium carbonate). After processing per this process, wherein the reaction rate was controlled to accomplish a separation of saline materials of approximately seventy percent (70%) of the amount contained in the saline water, analysis of the processed water showed that the total of solid materials remaining dissolved and suspended in the water measured 10,660 milligrams solids per litre of water. Of these solids 1,530 milligrams were $CaCO_3$ (calcium carbonate). The control was subsequently adjusted to cause more separation and removal of saline materials; the resulting analyses showing the processed water to contain 650 milligrams per litre of water of solid matter, of which 320 milligrams were $CaCO_3$.

The reacted materials do not adhere to the cathode but disengage as their density increases and fall to the bottom of the vessel in which they are contained. Non-reacting materials suspended in the water being processed become charged in the electrical field between the cathode and anode. Each particle will then be attracted to the next as their respective negative and positive poles come into opposition. Ultimately the accumulated density exceeds their former buoyancy as a result of the coalescence by attraction and these materials deposit at the bottom of the vessel in which they are contained.

The electric current produced as by a by-product of the desalination process chemical reactions was measured to have an average value of 0.000022 ampere per square inch of cathode surface in contact with the saline water being processed. For each combination of cathode and anode the electromotive force was measured to be 0.5 volt. The rate of separation and removal of saline materials from the water, termed desalination, has been calculated. The calculations are based on the amount of material separated and removed from the water, the observed change in measurement of electric current and the amount of water processed. The rate of desalination of one cubic inch of saline water in contact with the surfaces of one cathode and one anode of one square inch area, where the cathode and anode are in mutual contact with an electrically conductive material not in contact with the water, is two minutes for water having a content of 650 parts of solid material in suspension and solution per million parts of water after processing from an original state wherein 44,000 parts of solid material in suspension and solution per million parts of water were measured before processing.

By analysis 31,675 parts of cathode materials were reacted and removed from the cathode for each million parts of water processed, where the processed water contained 650 parts of solid material in suspension and solution for each million parts of water.

The material separated and removed from the water by the desalination process described herein, are removed from the bottom of the vessels in which they are deposited, and made available for processing into chemicals, metals, chemical products, metal products and all other uses to which they are applicable. Many of the materials released by the chemical reactions of the process are released as gases, such as hydrogen, oxygen, chlorine and others.

These gases partially combine in the water, small portions of chlorine gas dissolving in the water. Hydrogen and chlorine combine to form hydrochloric acid that in turn reacts with calcium carbonate resulting in free hydrogen gas and precipitant calcium chloride. The hydrogen gas expands out of the water to atmosphere.

The chlorine gas is released when the sodium chloride molecule is disrupted by the electrochemical reactions of this process. As the chlorine atoms are recombined as described in the foregoing so does the sodium atom combine with the carbon atom of the disrupted calcium carbonate molecule resulting in precipitant sodium carbonate and sodium hydroxide.

For a clearer understanding of the invention, specific examples of the invention are given below. These examples are merely illustrative and are not to be understood as limiting the scope and underlying principles of the invention.

EXAMPLE I

A tubular container of copper was constructed into which a cylindrical rod of aluminum was suspended coaxially. The aluminum cathode was connected to the copper anode with an electrical conductor.

The entire assembly was oriented with the axes of the cylindrical parts perpendicular to the earth's surface. Saline water was introduced into the anode container. The saline water had a content of dissolved and solid saline matter of 35,500 parts per million parts of water. The distance by which the surfaces of the anode container and cathode rod were separated was 0.75 inch. The water was permitted to remain in the container one (1) hour. After one (1) hour the water was removed and tested. The remaining dissolved and suspended solid material was measured at 28,900 parts per million parts of water.

EXAMPLE II

Four tubular copper anode containers were connected in such a manner as to permit saline water to be introduced a distance from the bottom of one tube, then permitted to flow out of the top of that tube into the next tube where the inlet was in the identical location of the first, and so on for all four tubes. The distance from the bottom of the containers to the inlets was sufficient not to impede the deposition of the precipitants nor cause the incoming water to be mixed with the precipitants.

Tubular aluminum cathode elements were then suspended into the anode container. The cathodes were connected together by an electrically conductive material. The anodes were connected together by an electrically conductive material. The anodes were then connected to one side of a meter calibrated to be read in milliamperes. The cathodes were connected to an electrical resistance of 10 ohms. The electrical resistance was connected to the other side of the ammeter.

The axes of the anode containers and the cathodes were coaxial and oriented to be perpendicular with the earth's surface. The total capacity of the system was measured at 2.7 gallons of water. At the bottom of each container a means was provided for the removal of precipitants.

Saline water was introduced and permitted to flow continually through the system at a rate of 2.7 gallons per day. This produced .05 amperes of electrical current at an electromotive force of .5 volts continually. The water was tested. The total dissolved and suspended solid saline materials were 36,300 parts per million parts of water before introduction into the process and 370 parts per million parts of water after ejection from the process. The cathode reduction rate was calculated at .0013 ounces avoirdupois of aluminum lost for each 100 gallons of water desalinated. The precipitants were removed as a dense brine that measured 104,000 parts per million parts water of suspended solids for each 2.7 gallons processed.

The present invention in its broader aspects is not limited to the specific minerals, mechanizations and examples described, but also includes within the scope of the accompanying claims any departures made from such minerals, mechanizations and examples which do not sacrifice their chief advantages.

What is claimed is:

1. The process of desalination of salt water which comprises flowing such water between spaced-apart, substantially vertically arranged dissimilar metal electrodes in a cell-like means, the electrodes being connected by an electrical conductor outwardly of the water, whereby an electrical current flows between them, attracting, by such flow of current, portions of the salts to each electrode, whereby to cause an increase in density in the water adjacent to each electrode, permitting settlement downward from adjacent the electrodes to the bottom of the cell-like means, and removing from the bottom a brine of greater concentration than that of the water thereabove.

2. The process as defined in claim 1 together with the subsequent steps of flowing the upper portions of such water between electrodes of further cell-like means, and repeating therein the remainder of the steps so set forth, whereby to effect progressive desalination.

References Cited

UNITED STATES PATENTS

| | | | |
|---|---|---|---|
| 566,324 | 8/1896 | Kendrick | 204—150 |
| 2,451,067 | 10/1948 | Butler | 204—248 |
| 3,342,712 | 9/1967 | O'Keefe | 204—148 |

HOWARD S. WILLIAMS, Primary Examiner

A. C. PRESCOTT, Assistant Examiner

U.S. Cl. X.R.

204—148, 248